US012352087B2

(12) United States Patent
Kroess et al.

(10) Patent No.: US 12,352,087 B2
(45) **Date of Patent: *Jul. 8, 2025**

(54) FURNITURE DRIVE

(71) Applicant: Julius Blum GmbH, Hoechst (AT)

(72) Inventors: Klaus Kroess, Dornbirn (AT); Thomas Leitner, Lustenau (AT); Kilian Laesser, Moeggers (AT); Kurt Haemmerle, Lustenau (AT)

(73) Assignee: JULIUS BLUM GMBH, Hoechst (AT)

(*) Notice: Subject to any disclaimer, the term of this patent is extended or adjusted under 35 U.S.C. 154(b) by 182 days.

This patent is subject to a terminal disclaimer.

(21) Appl. No.: 18/121,337

(22) Filed: Mar. 14, 2023

(65) Prior Publication Data

US 2023/0272653 A1 Aug. 31, 2023

Related U.S. Application Data

(63) Continuation of application No. PCT/AT2021/060382, filed on Oct. 15, 2021.

(30) Foreign Application Priority Data

Oct. 22, 2020 (AT) .............................. A 50909/2020

(51) Int. Cl.
*E05D 15/00* (2006.01)
*E05D 3/12* (2006.01)
(Continued)

(52) U.S. Cl.
CPC ............. *E05D 15/401* (2013.01); *E05D 3/12* (2013.01); *E05D 15/463* (2013.01); *E05F 1/12* (2013.01);
(Continued)

(58) Field of Classification Search
CPC ........... E05D 3/06; E05D 3/12; E05D 15/401; E05D 15/463; E05D 15/46; E05D 7/123;
(Continued)

(56) References Cited

U.S. PATENT DOCUMENTS

| | | | |
|---|---|---|---|
| 7,694,459 B2 | 4/2010 | Brunnmayr | |
| 7,794,028 B2 | 9/2010 | Brunnmayr | |

(Continued)

FOREIGN PATENT DOCUMENTS

| | | | |
|---|---|---|---|
| AT | 516783 | 8/2016 | |
| AT | 518078 B1 * | 7/2017 | ......... E05D 11/1021 |

(Continued)

OTHER PUBLICATIONS

International Search Report issued Jan. 19, 2022 in International (PCT) Application No. PCT/AT2021/060382.

*Primary Examiner* — Janet M Wilkens
(74) *Attorney, Agent, or Firm* — Wenderoth, Lind & Ponack, L.L.P.

(57) ABSTRACT

A furniture drive for moving a furniture front relative a furniture carcass includes a base body to be fixed to the furniture carcass, and an actuating arm pivotally supported on the base body about at least one first pivoting axis in a mounted condition. The actuating arm includes a plurality of levers hingedly connected to one another, and at least two of the levers of the actuating arm are configured to be releasably connected to the base body of the furniture drive. At least the levers of the actuating arm are symmetrically arranged with respect to a notional middle plane of the actuating arm.

32 Claims, 10 Drawing Sheets

(51) Int. Cl.

| | |
|---|---|
| ***E05D 15/40*** | (2006.01) |
| ***E05D 15/46*** | (2006.01) |
| ***E05F 1/12*** | (2006.01) |

(52) U.S. Cl.

CPC ....... *E05Y 2201/22* (2013.01); *E05Y 2201/62* (2013.01); *E05Y 2900/20* (2013.01)

(58) Field of Classification Search

CPC ........... E05Y 2201/604; E05Y 2201/62; E05Y 2201/624; E05Y 2900/20; E05F 1/12

USPC ...................... 16/302; 312/325, 319.1, 319.2

See application file for complete search history.

(56) References Cited

U.S. PATENT DOCUMENTS

| | | | | |
|---|---|---|---|---|
| 8,590,107 | B2 | 11/2013 | Omann | |
| 10,246,915 | B2 | 4/2019 | Brunnmayr | |
| 11,053,723 | B2 * | 7/2021 | Sobolewski | E05F 3/20 |
| 2007/0193572 | A1 * | 8/2007 | Lee | E05D 7/125 126/194 |
| 2007/0257538 | A1 | 11/2007 | Brunnmayr | |
| 2008/0054771 | A1 | 3/2008 | Brunnmayr | |
| 2011/0193458 | A1 | 8/2011 | Omann | |
| 2013/0026318 | A1 | 1/2013 | Kashiwaguma | |
| 2017/0328103 | A1 | 11/2017 | Brunnmayr | |
| 2018/0298661 | A1 * | 10/2018 | Salice | E05F 1/1058 |
| 2023/0340818 | A1 * | 10/2023 | Schmid | E05D 13/12 |
| 2023/0358087 | A1 * | 11/2023 | Kroess | E05F 1/1041 |

FOREIGN PATENT DOCUMENTS

| | | | | |
|---|---|---|---|---|
| CA | 3067762 | A1 * | 1/2019 | E05D 15/40 |
| CN | 108487808 | A * | 9/2018 | E05D 11/10 |
| EP | 2551433 | A2 * | 1/2013 | E05D 15/40 |
| EP | 1 812 674 | | 5/2013 | |
| EP | 2 342 409 | | 3/2017 | |
| EP | 3 321 461 | | 5/2018 | |
| JP | 2005-232874 | | 9/2005 | |
| JP | 2013-28975 | | 2/2013 | |
| WO | 2006/113953 | | 11/2006 | |
| WO | 2016/127190 | | 8/2016 | |

* cited by examiner

FURNITURE DRIVE

BACKGROUND OF THE INVENTION

The present invention relates to a furniture drive for moving a furniture front relative to a furniture carcass, and the furniture drive comprises a base body configured to be fixed to the furniture carcass and an actuating arm pivotally supported about at least one pivoting axis on the base body. The actuating arm includes a plurality of levers hingedly connected to one another, and at least two of the levers of the actuating arm are configured to be releasably connected to the base body of the furniture drive.

Moreover, the invention relates to an item of furniture comprising a furniture carcass, a furniture front, and at least one furniture drive of the type to be described. The base body of the at least one furniture drive is fixed to the furniture carcass, preferably within and/or to a sidewall of the furniture carcass, and the furniture front is fixed, preferably via a fastening interface, to the actuating arm of the at least one furniture drive.

Finally, the invention relates to a method for mounting an actuating arm to a base body of a furniture drive of the type to be described.

Such furniture drives include a base body configured to be fixed to the furniture carcass and an actuating arm having at least two levers hingedly connected to one another. The two levers of the actuating arm can be connected to two bearing locations of the base body, the two bearing locations being separate from one another. The separate configuration between the base body and the actuating arm has the advantage that the constructional size of the furniture drive can be divided into two constructional units, and that these constructional units can be modularly connected to one another.

A drawback with the prior art (for example as shown in WO 2006/113953 A1) is the fact that the actuating arms having at least two levers for the common attachment to the base body can be used only on one side, that is to say only in combination with a first base body of the furniture drive, the first body being configured to be fixed to a first side of a furniture carcass. However, for a second base body to be fixed to an opposing sidewall of the furniture carcass, a mirror-like actuating arm has to be provided. This is more difficult to manufacture, because two different assembly lines must be provided in the factory for this purpose. Moreover, the handling for an assembly person on site is more complicated, because a distinction between "left" and "right" actuating arms has always to be made.

AT 516783 A1 to the present applicant discloses a support device for a furniture flap. The support device includes two supporting arms configured to overlap in each position of the support device in a direction extending lateral to the movement direction of the support device. A first support arm can have a U-profile in which a second support arm can be arranged. The supporting arms are non-releasably connected to a housing of the support device, and the pivoting axes of the supporting arms are located within the interior of the housing and are, therefore, not accessible.

EP 3 321 461 A1 and US 2018/0298661 A1 disclose furniture drives for moving a furniture flap, and an actuating arm configured to be connected to the furniture flap can be releasably connected to a base body of the furniture drive.

SUMMARY OF THE INVENTION

It is an object of the present invention to propose an actuating drive mentioned in the introductory part, thereby avoiding the above-discussed drawbacks.

According to the invention, at least the levers of the actuating arm are symmetrically arranged with respect to a notional middle plane of the actuating arm.

Due to the symmetrical configuration of the levers of the actuating arm with respect to a notional middle plane of the actuating arm, the levers can also be connected to a base body of a second furniture drive configured to be fixed to an opposing sidewall of the furniture carcass.

Accordingly, only one single type of actuating arm is required for the two furniture drives for moving the furniture front, and the manufacture and also the handling of the actuating arm can be significantly facilitated.

BRIEF DESCRIPTION OF THE DRAWINGS

Further details and advantages of the present invention result from the following description of figures, in which.

DETAILED DESCRIPTION OF THE INVENTION

Figure 1A:
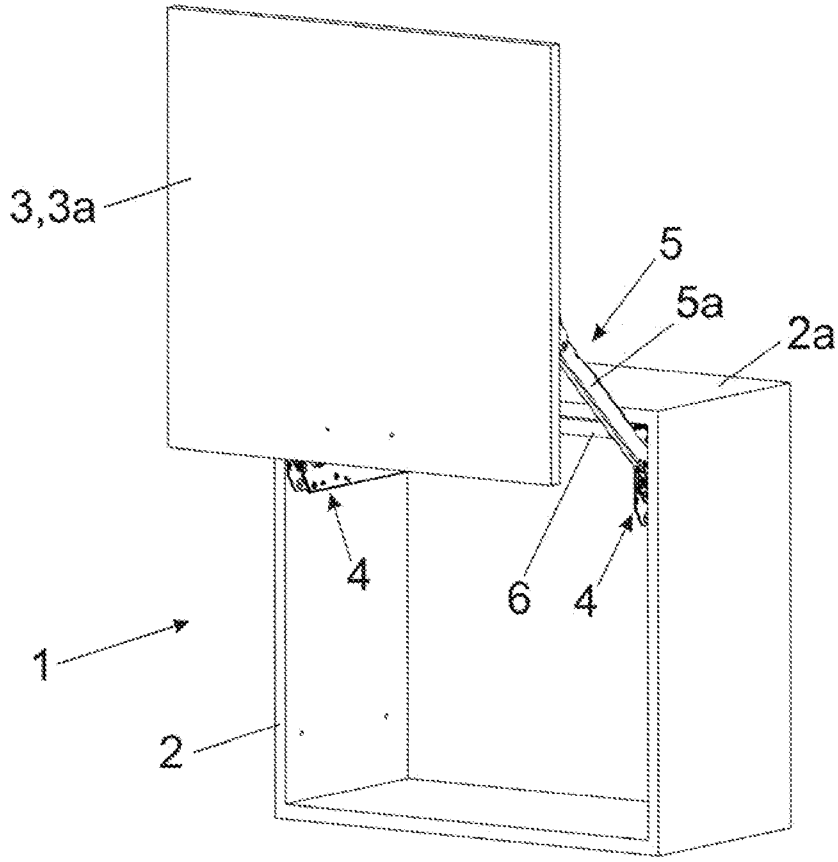
FIGS. 1*a*, 1*b* show an item of furniture comprising a movable furniture front and two furniture drives for moving the furniture front, and the item of furniture with the furniture front removed.

FIG. 1*a* shows an item of furniture 1 comprising a furniture carcass 2 and a movable furniture front 3 in the form of a furniture flap 3*a* which can be elevated relative to the furniture carcass 2. The furniture front 3 can have a one-piece configuration, or can also include a plurality of furniture parts movably connected to one another.

On each of the opposing sidewalls of the furniture carcass 2, a furniture drive 4 is fixed for moving the movable furniture front 3. Each of the furniture drives 4 includes a pivotally supported actuating arm 5, and a pivotal movement of the two actuating arms 5 of the furniture drives 4 can be synchronized with one another via a synchronization shaft 6.

Figure 1B:
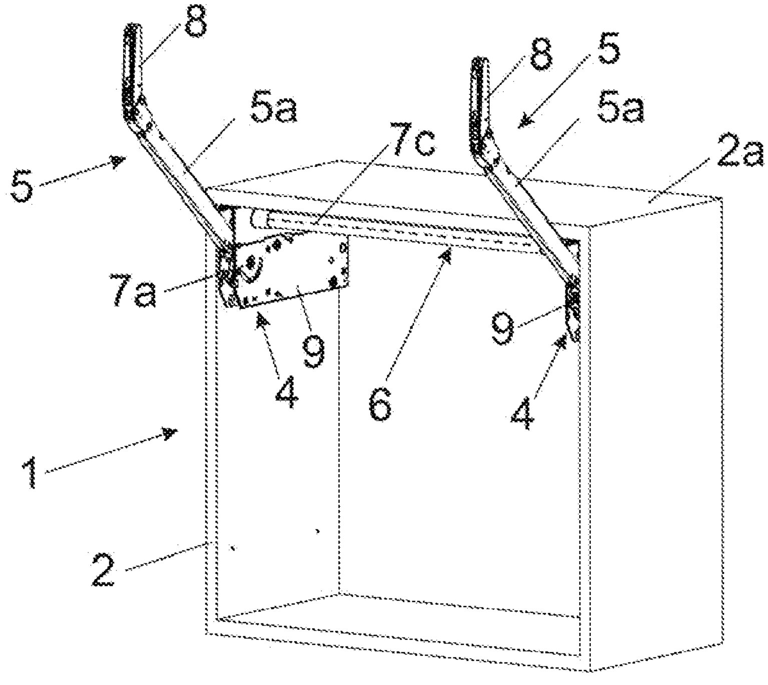

FIG. 1*b* shows the item of furniture 1 according to FIG. 1*a* with the furniture front 3 removed. The two furniture drives 4 can be configured identical in construction. Therefore, the explanations provided here are valid for both furniture drives 4.

The furniture drive 4 includes a, preferably substantially cuboidal, base body 9 configured to be fixed to the furniture carcass 2. A lever 5*a* of the actuating arm 5 is pivotally supported about a pivoting axis 7*a* on the base body 9. In contrast, the synchronization shaft 6 is rotatably supported about a further pivoting axis 7*c*, and pivoting axis 7*a* of the lever 5*a* and the further pivoting axis 7*c* of the synchronization shaft 6 are arranged laterally offset to one another, preferably mutually spaced from one another in a parallel relationship.

The offset arrangement between the pivoting axis 7*a* of the lever 5*a* and the pivoting axis 7*c* of the synchronization shaft 6 has the particular advantage that the synchronization shaft 6 can be arranged, for example, on a high location within the furniture carcass 2, that is to say close to a top panel 2*a* of the furniture carcass 2.

Further, it can be provided that the pivoting axis 7*c*, in a mounted condition of the furniture drive 4, can be arranged deeper in a direction extending in the depth of the furniture carcass 2, compared with a known coaxial arrangement between the pivoting axis 7*a* and the pivoting axis 7*c*.

The actuating arm 5 includes a fitting portion 8 configured to be releasably connected to a fitting body (not shown) to be arranged on the furniture front 3. The fitting portion 8 can be hingedly connected to the lever 5*a* of the actuating arm 5, and can be configured such that the fitting portion 8 is connectable to the fitting body to be fixed to the furniture front 3 without the use of a tool.

Figure 2A:
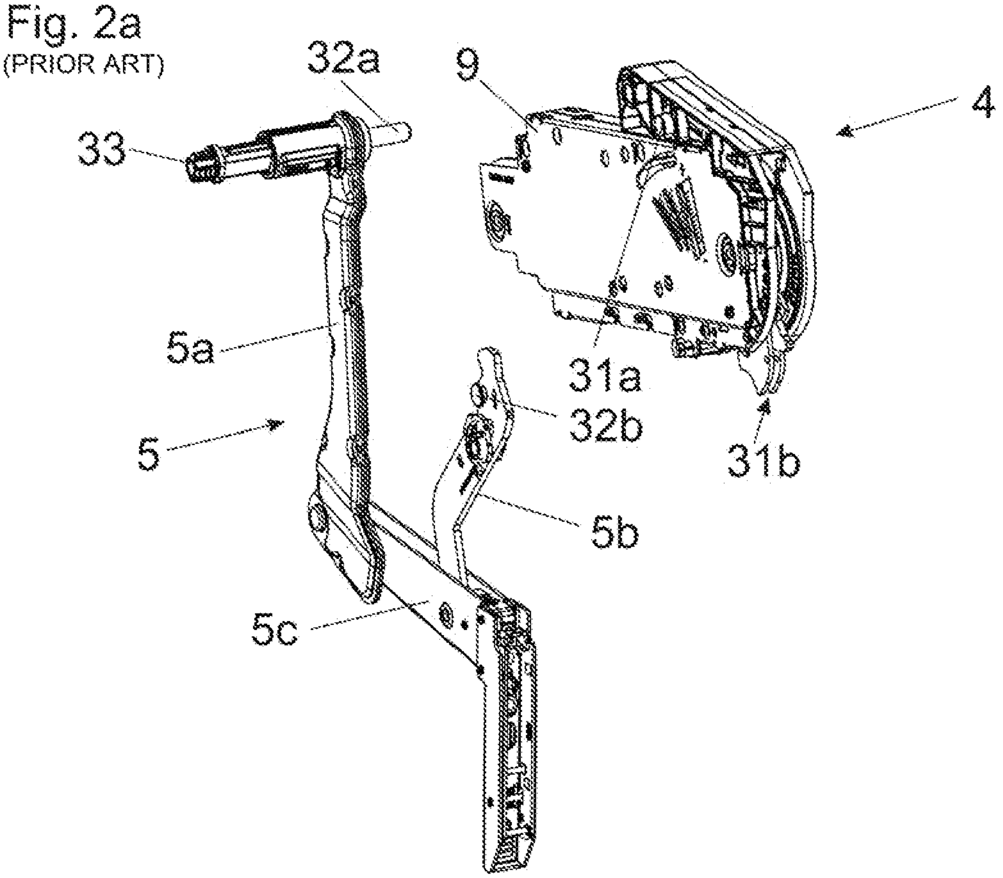
Fig. 2a (PRIOR ART)
FIGS. 2*a*, 2*b* show the furniture drive with an actuating arm according to the prior art in an unconnected and in a connected condition with the base body.

FIG. 2*a* shows a furniture drive 4 with an actuating arm 5 according to the prior art in an unconnected condition with the base body 9 of the furniture drive 4. Usually, a force storage member 12 (FIG. 4*a*) is received within the base body 9 of the furniture drive 4 so as to compensate for a weight of the furniture front 3 to be fixed to the actuating arm 5, the base body 9 being configured to be fixed to the furniture carcass 2. The base body 9 of the furniture drive 4 includes at least two bearing locations 31*a*, 31*b* separate from one another. The at least two bearing locations 31*a*, 31*b* are configured to be releasably connected to connecting elements 32*a*, 32*b* of the actuating arm 5, the connecting elements 32*a*, 32*b* being separate from one another.

The actuating arm 5 includes at least two or more levers 5*a*, 5*b*, 5*c* hingedly connected to one another, the first connecting element 32*a* being arranged on a first lever 5*a* and a second connecting element 32*b* being arranged on a second lever 5*b*. The third lever 5*c*, which is preferably angled about approximately 90°, is to be connected to the furniture front 3. A coupling portion 33 arranged on the first lever 5*a* is configured to be connected to the synchronization shaft 6. A pivoting movement of the coupling portion 33 can be synchronized via the synchronization shaft 6 to a coupling portion 33 of the opposing furniture drive 4 in the mounted position.

Figure 2B:
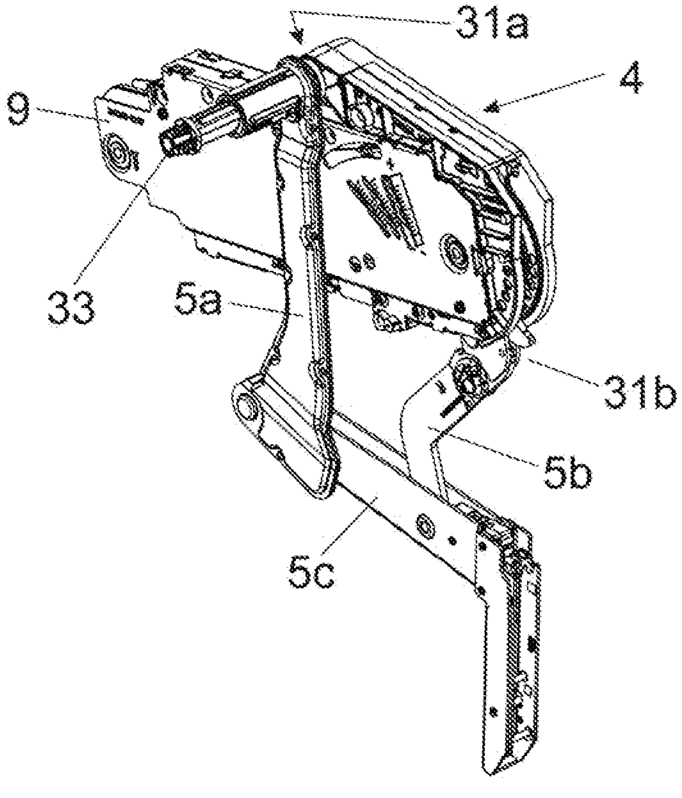
Fig. 2b (PRIOR ART)

FIG. 2*b* shows the actuating arm 5 according to the prior art in a connected condition with the base body 9 of the furniture drive 4. With the aid of FIG. 2*b*, it is immediately apparent that the actuating arm 5 according to the prior art, due to its asymmetric configuration, can only be utilized on one side only. In the present case, the actuating arm 5 can only be utilized with a furniture drive 4 to be fixed to a right sidewall of the furniture carcass 2. For a furniture drive 4 to be fixed to a left sidewall of the furniture carcass 2, a mirror-like actuating arm 5 has to be used.

Figure 3A:
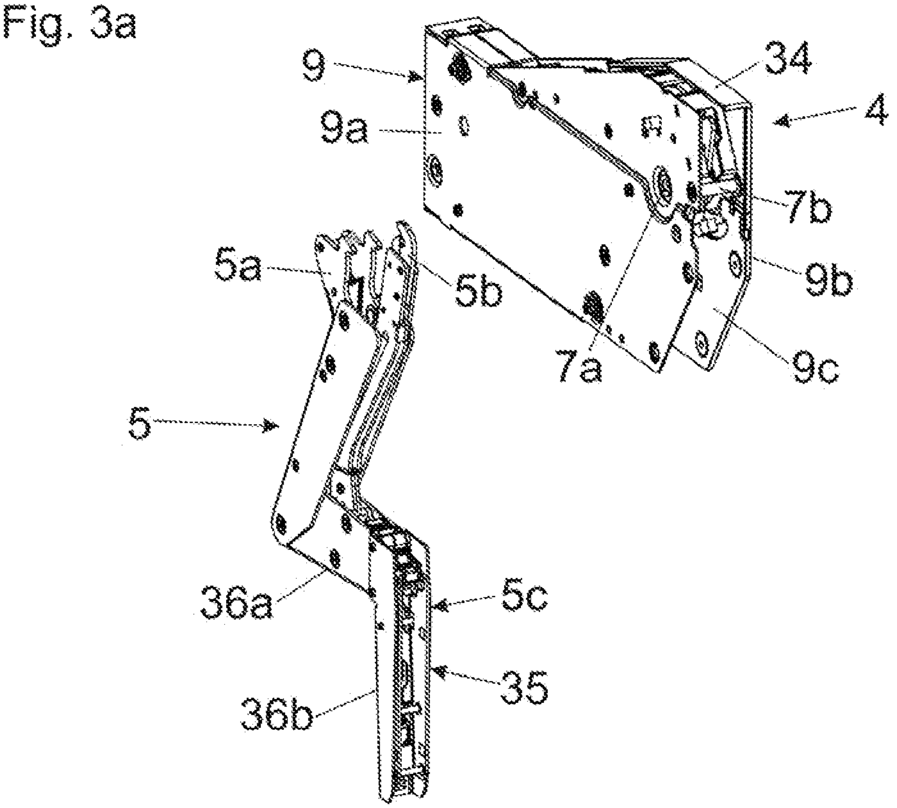
FIGS. 3*a*, 3*b* are a perspective view and a cross-sectional view of a furniture drive according to the invention with an actuating arm in an unconnected condition with the base body.

FIG. 3*a* shows a furniture drive 4 according to the invention with an actuating arm 5 in an unconnected condition with the base body 9. The base body 9 of the furniture drive 4 includes two housing walls 9*a*, 9*b* mutually spaced from one another in a parallel relationship, and each of the housing walls 9*a*, 9*b* has a flat-shaped bearing surface configured to bear against a furniture carcass 2. Therefore, the base body 9 of the furniture drive 4 can be fixed either to a first sidewall of the furniture carcass 2 or, alternatively, to a second sidewall of the furniture carcass 2, the second sidewall opposing the first sidewall. A front opening 9*c* is formed between the housing walls 9*a*, 9*b*, and the actuating arm 5 projects at least partially through the front opening 9*c* in a maximum opening position.

The actuating arm 5, in a mounted condition, is pivotally supported on the base body 9 about at least one first pivoting axis 7*a*. The actuating arm 5 includes a plurality of levers 5*a*, 5*b*, 5*c* hingedly connected to one another. At least two of the levers 5*a*, 5*b* of the actuating arm 5 are configured to be releasably connected to the base body 9 of the furniture drive 4.

The actuating arm 5 is movable between a closed position and a maximum open position. In the closed position, and the actuating arm 5 is at least partially arranged within the base body 9 of the furniture drive 4.

The levers 5*a*, 5*b*, 5*c* of the actuating arm 5 can form a four-pivot-point geometry, and one of the four pivot points of the four-pivot-point geometry corresponds to the at least one first pivoting axis 7*a* of the actuating arm 5.

In the shown embodiment, the actuating arm 5 is pivotally supported on the base body 9 about at least one second pivoting axis 7*b*, wherein

- the base body 9 of the furniture drive 4 has a front opening 9*c*, and the actuating arm 5 projects at least partially through the front opening 9*c* in a maximum open position, the second pivoting axis 7*b* having a smaller perpendicular distance to the front opening 9*c* than the first pivoting axis 7*a*, and/or
- the base body 9 of the furniture drive 4 has an upper side 34 facing towards a top panel 2*a* (FIG. 1*a*, 1*b*) of the furniture carcass 2 in a fixed condition of the furniture drive 4 on the furniture carcass 2, the second pivoting axis 7*b* having a smaller perpendicular distance to the upper side 34 than the second pivoting axis 7*b*.

According to an embodiment, it can be provided that the second pivoting axis 7*b* corresponds to a pivot point of the four-pivot-point geometry of the levers 5*a*, 5*b*, 5*c* of the actuating arm 5.

Further, it can be provided that

- at least two of the provided levers 5*a*, 5*b* of the actuating arm 5, in at least one pivoting position, preferably in each pivoting position, of the actuating arm 5 are nested into each another, so that the two levers 5*a*, 5*b* are arranged in a gap-free manner relative to one another in a view from the side, and/or
- at least one lever 5*a*, 5*b* is configured to be U-shaped in a cross-section, and a further lever 5*b* is at least partially arranged or can be arranged between the vertical limbs of the U-form.

A fastening interface 35 is arranged on the third lever 5*c*, and the furniture front 3 can be, preferably releasably, fixed to the actuating arm 5 via the fastening interface 35. The first lever 5*a* and the second lever 5*b* are hingedly connected to the third lever 5*c*. The third lever 5*c* is configured to have an angled shape, and two partial portions 36*a*, 36*b* of the angled third lever 5*c* adopt an angle of substantially 90° relative to one another.

Figure 3B:
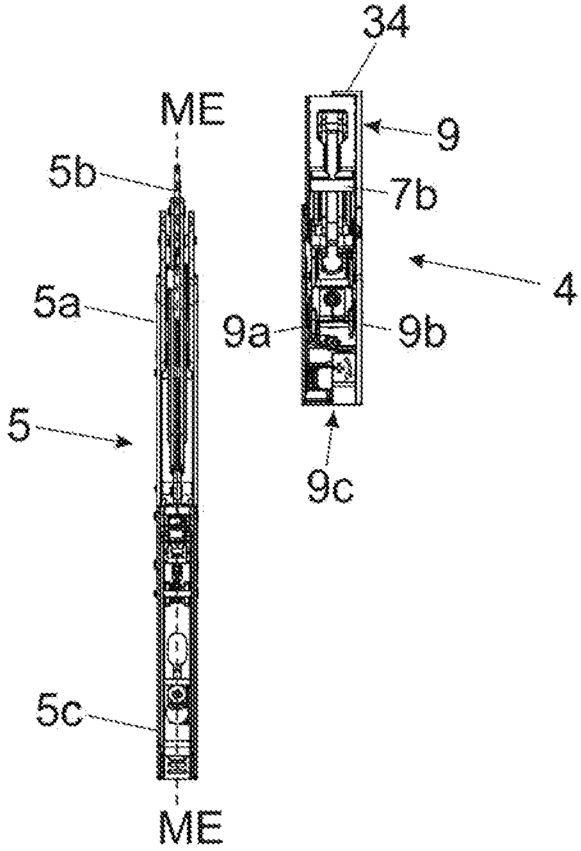

FIG. 3*b* shows a cross-sectional view of the furniture drive 4 with the base body 9 and the actuating arm 5 to be connected to the base body 9. To be seen are the housing walls 9*a*, 9*b* of the base body 9, the front opening 9*c* formed between the housing walls 9*a*, 9*b*, and the upper side 34 of the base body 9.

Moreover, it can be seen that the levers 5*a*, 5*b*, 5*c* of the actuating arm 5 are symmetrically arranged relative to a notional middle plane (ME) of the actuating arm 5. As a result, the actuating arm 5 can be releasably connected to a base body 9 to be fixed to a first sidewall of the furniture carcass 2, and can also be connected to a base body 9 to be fixed to a second sidewall of the furniture carcass 2, the second sidewall opposing the first sidewall.

Preferably, it can be provided that one of the levers 5*b* of the actuating arm 5 is arranged in the middle plane (ME) of the actuating arm 5.

Figure 4A:
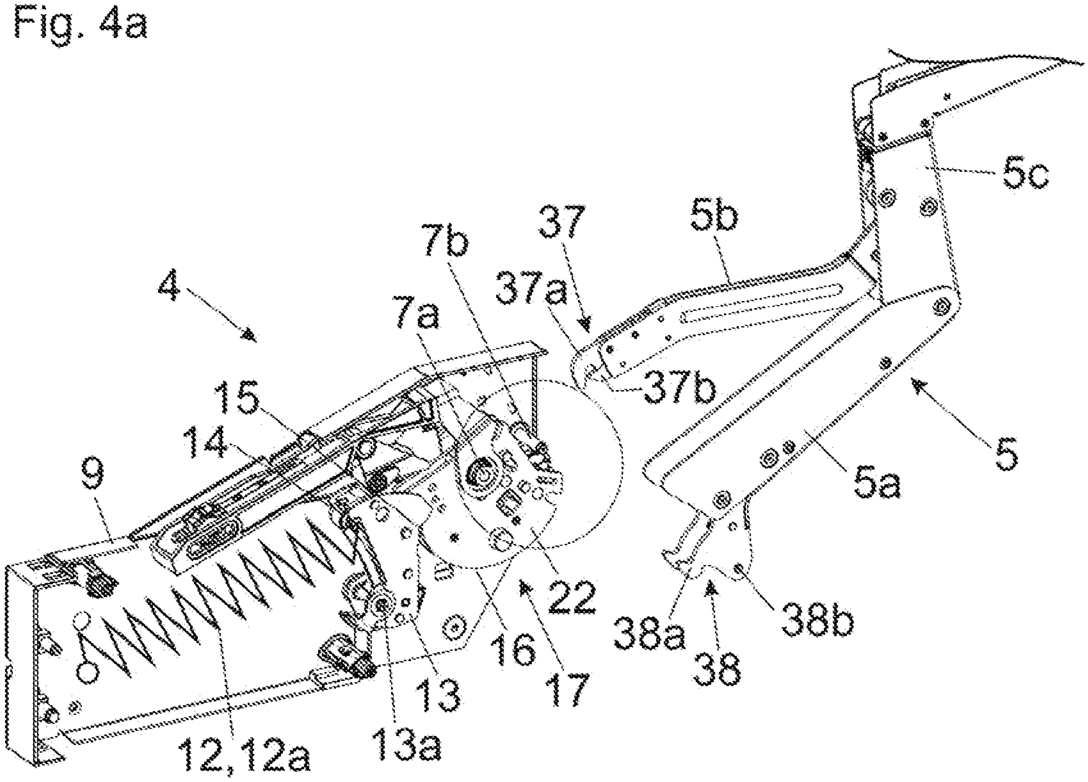
FIGS. 4*a*, 4*b* show an embodiment of a furniture drive with a base body and with an actuating arm configured to be fixed to the base body.

FIG. 4*a* shows an embodiment of a furniture drive 4 with the base body 9 and an actuating arm 5 to be connected to the base body 9.

The furniture drive 4 includes at least one force storage member 12, preferably having at least one spring element 12*a*, for applying a force to the actuating arm 5. Preferably, the force storage member 12 is supported on the base body 9. In this way, a weight of the furniture front 3 to be fixed to the actuating arm 5 can be compensated for.

In FIG. 4*a*, the force storage member 12 is only schematically depicted and can also include, besides mechanical spring elements, a gas spring for example. As an alternative or in addition to the force storage member 12, an electric drive for driving the actuating arm 5 can also be provided.

According to an embodiment, it can be provided that a transmission mechanism 17 is provided for transmitting a force, that can be stored in the at least one force storage member 12, to the actuating arm 5. Preferably, the transmission mechanism 17

- includes at least one intermediate lever 13 pivotable about a pivoting axis 13*a*, preferably wherein the at least one force storage member 12 is connected to the at least one intermediate lever 13 via an, preferably adjustable, engagement location 14, and/or
- includes at least one pressure portion 15, preferably a rotatable pressure roller, and at least one setting contour 16 on which the at least one pressure portion 15 can be displaceably supported upon a movement of the actuating arm 5, preferably wherein the at least one pressure portion 15 is arranged on the at least one intermediate lever 13 of the transmission mechanism 17 and the at least one setting contour 16 is arranged or can be arranged on the actuating arm 5, or vice versa.

The actuating arm 5 includes two or a plurality of levers 5*a*, 5*b*, 5*c* hindedly connected to one another. In the shown embodiment, the first lever 5*a* and/or the third lever 5*c* has or have a U-shaped portion in a cross-section, and the second lever 5*b* is arranged or can be arranged within the U-shaped portion.

Figure 5A:
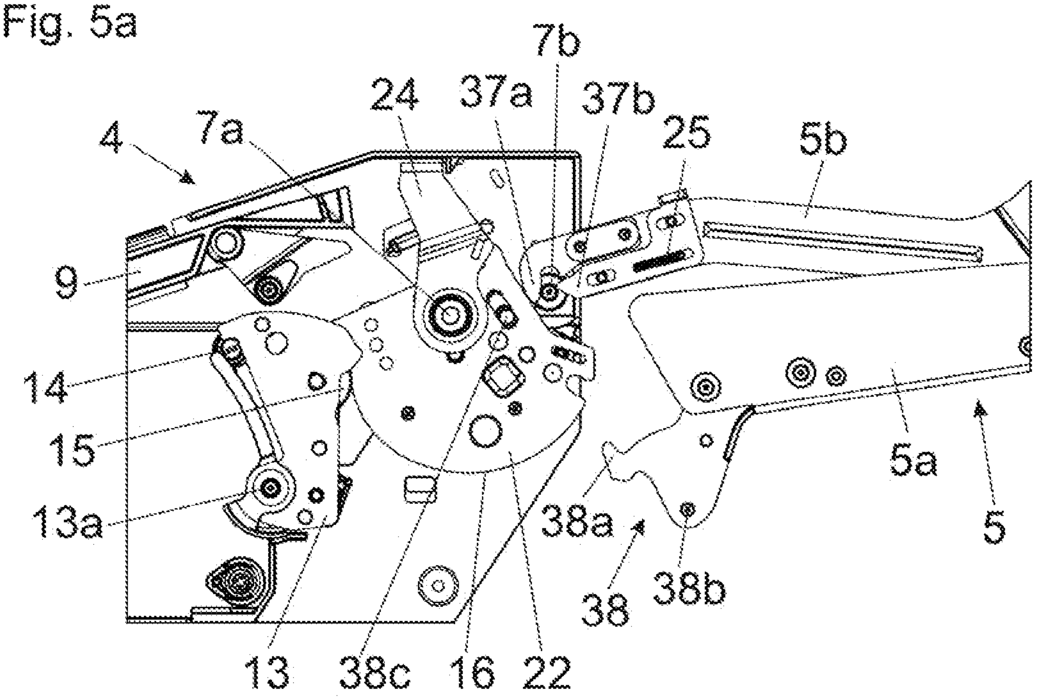
FIGS. 5*a*, 5*b* show the mounting operation of the actuating arm to the base body in two subsequent steps.

In the shown embodiment, the actuating arm 5 can be releasably connected to the base body 9 of the furniture drive 4 via connection devices 37, 38. For example, it can thereby be provided that at least one connection device 37, 38 includes at least one fastening portion 37*a*, 38*a* configured to be hung into or configured to be inserted into the base body 9 and/or at least one locking element 37*b* pressurized by a spring 25 (FIG. 5*a*). The first, preferably hook-shaped, fastening portion 37*a* of the lever 5*b* is configured to be hung into the base body 9, for example on a pin arranged on the second pivoting axis 7*b*, and the lever 5*b* can be releasably locked by the spring-loaded locking element 37*b*.

In contrast, the second fastening portion 38*a* of the other connection device 38 is configured to be releasably connected, particularly locked, to a movable actuating portion 22. Preferably, the movable actuating portion 22 is pivotable about the pivoting axis 7*a*. Preferably, it can be provided that the setting contour 16 is arranged on the movable actuating portion 22.

Figure 4B:
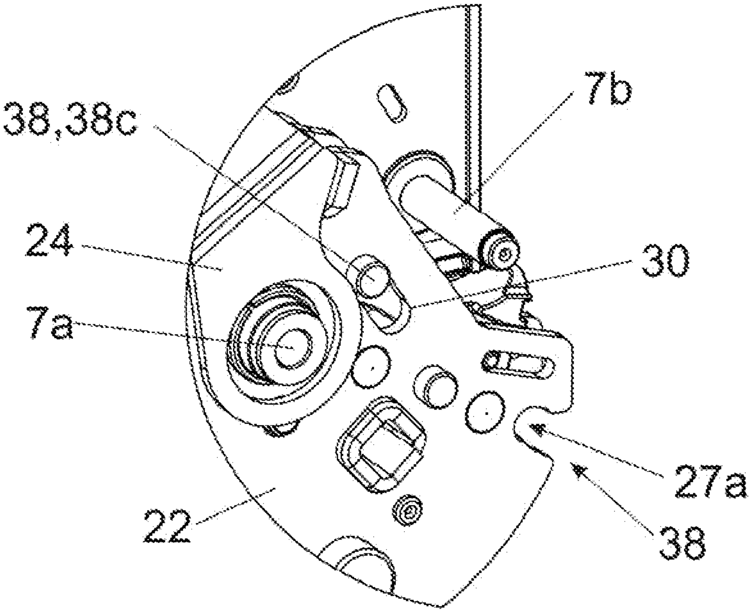

FIG. 4*b* shows the encircled region of FIG. 4*a* in an enlarged view. The connection device 38 can include a recess 27*a* arranged on the actuating portion 22. The lever 5*a*, preferably a locking element 38*b* (FIG. 4*a*) laterally projecting from the lever 5*a*, can be received within the recess 27*a*.

The lever 5*a* is configured to be releasably locked to a locking element 38*c* of the connection device 38. Preferably, it can be provided that the locking element 38*c* is configured as a pin and/or can be pressurized by a spring 25 in a direction of a locking position and/or can be moved along a guide track 30.

For releasing the locking between the locking element 38*c* and the lever 5*a*, a movable unlocking element 24 is provided. Preferably, the unlocking element 24 is pivotable about the pivoting axis 7*a*. By the unlocking element 24, the locking element 38*c* can be moved against the force of the spring 25 so as to release the lever 5*a*. In the shown figure, the locking element 38*c* is located in a locking position. In a locked position with the lever 5*a*, the locking element 38*c* must be located on the other end of the guide track 30.

FIG. 5*a* shows the mounting operation of the actuating arm 5 to the base body 9 in a first step, in which the fastening portion 37*a* of the connection device 37 of the lever 5*b* is to be hung into the pin arranged on the second pivoting axis 7*b*.

The locking element 37*b* can be seen, the locking element 37*b* being linearly displaceably supported, for example along at least one guide, and being pressurized by a spring 25 in a direction of the locking position. For example, the spring 25 can be formed by a mechanical spring element or also by a material elasticity of a component. It can be seen that the locking element 37*b* includes an inclined surface configured to urge the locking element 37*b* against the force of the spring 25 upon a co-operation with the hinge axis 7*b*.

Figure 5B:
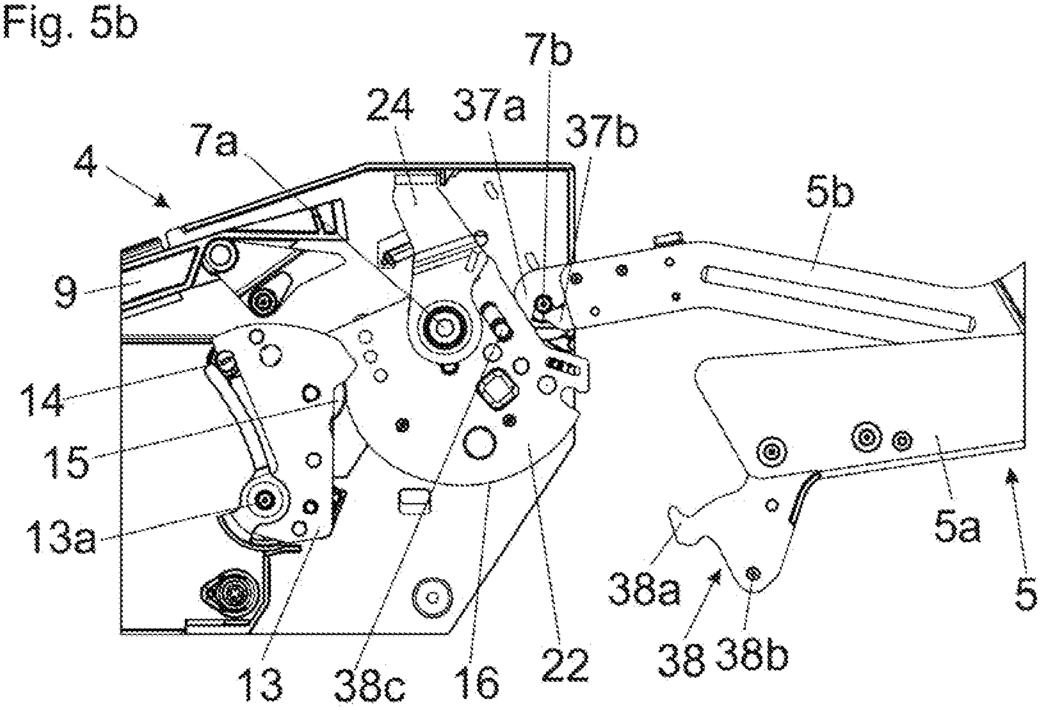

FIG. 5*b* shows the locking element 37*b* in a locked condition with the pivoting axis 7*b*. The locking element 37*b* has been moved from the position shown in FIG. 5*a* by its inclined surface against the force of the spring 25, and has subsequently been brought into a locking position with the pivoting axis 7*b* by a force of the relaxing spring 25. The lever 5*b* is now pivotally connected to the pivoting axis 7*b*.

Figure 6A:
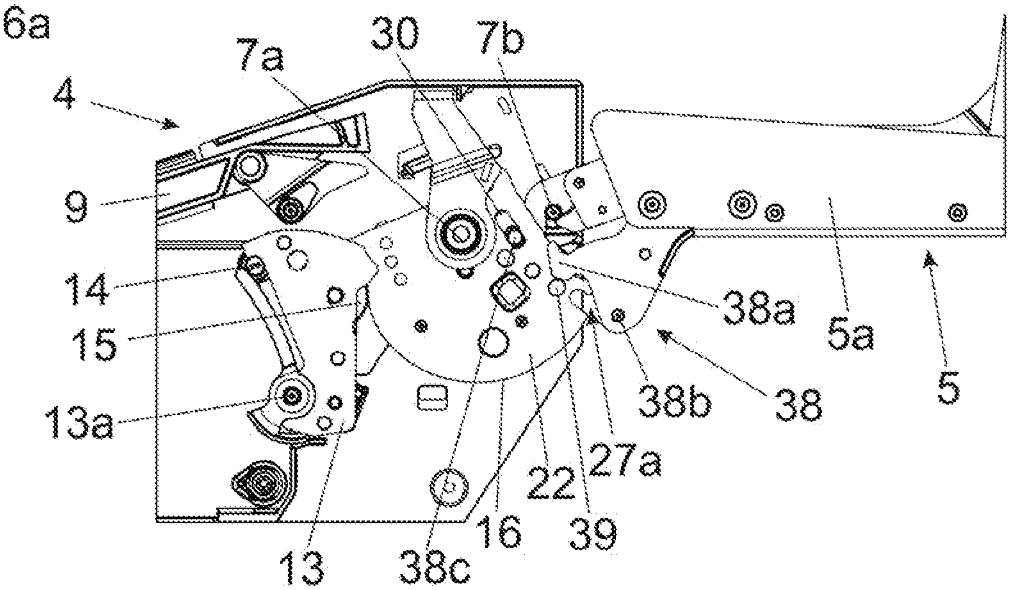
FIGS. 6*a*-6*c* show the mounting operation of the actuating arm to the base body in further steps.
Figure 6B:
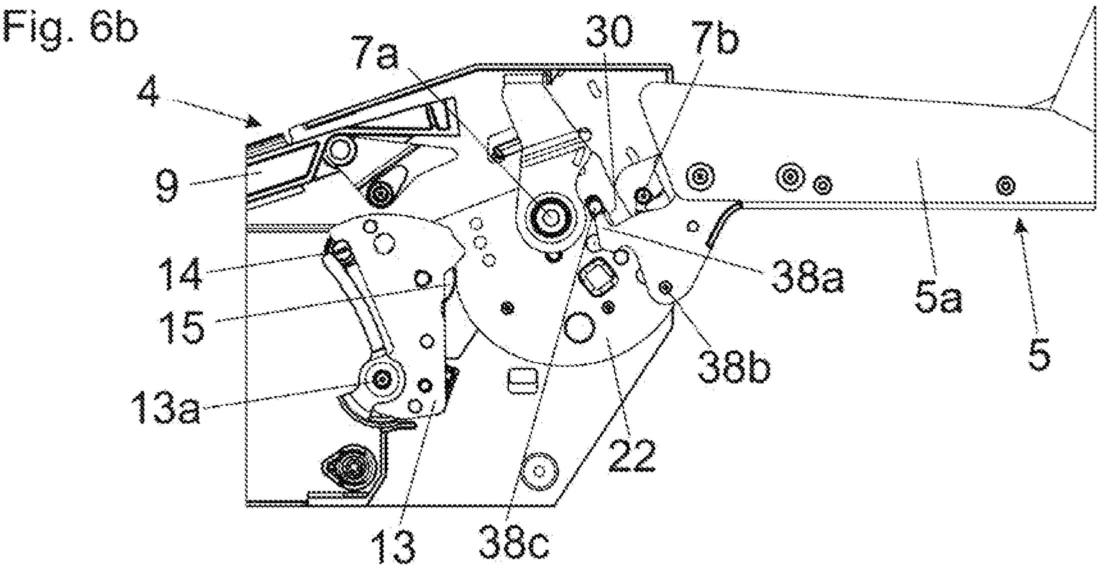
Figure 6C:
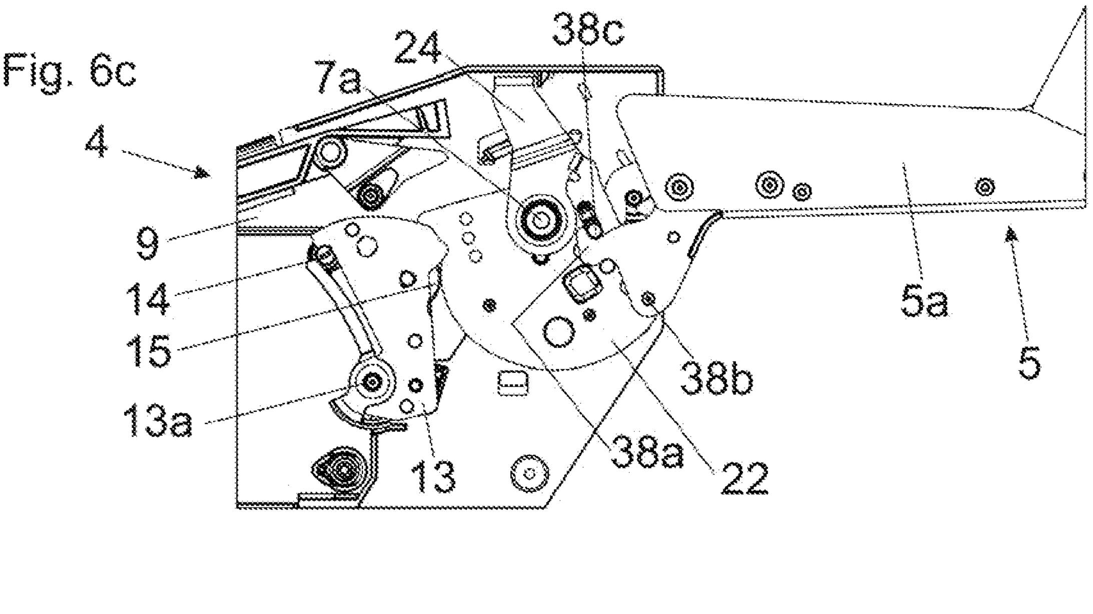

FIG. 6*a*-6*c* show the mounting operation of the actuating arm 5 to the base body 9 in further steps. Starting from the position shown in FIG. 5*b*, the levers 5*a*, 5*b* have been pivoted relative to the base body 9 about the pivoting axis 7*b*. The fastening portion 38*a* of the second connection device 38 is supportable on a guide element 39 arranged on the actuating portion 22 so as to introduce the laterally projecting locking element 38*b* of the lever 5*a* into the recess 27*a* of the actuating portion 22.

In FIG. 6*b*, it can be seen that the locking element 38*c* can be moved along the guide track 30 by the fastening portion 38*a* of the lever 5*a* against the force of a spring 25 (not shown here).

In FIG. 6*c*, it can be seen that the locking element 38*c* can enter into a locking recess of the fastening portion 38*a* due to a contour formed by the fastening portion 38*a* and due to the force of a loaded spring 25. As a result, the lever 5*a* can be releasably locked to the base body 9.

The locking between the lever 5*a* and the base body 9 can be released such that the unlocking element 24 is actuated, the unlocking element 24 being pivotable about the pivoting axis 7*a*. By an actuation of the unlocking element 24, the locking element 38*c* is movable against the force of the spring 25 pressurizing the locking element 38*c* so as to unlock the lever 5*a* from the locking element 38*c*.

Figure 7A:
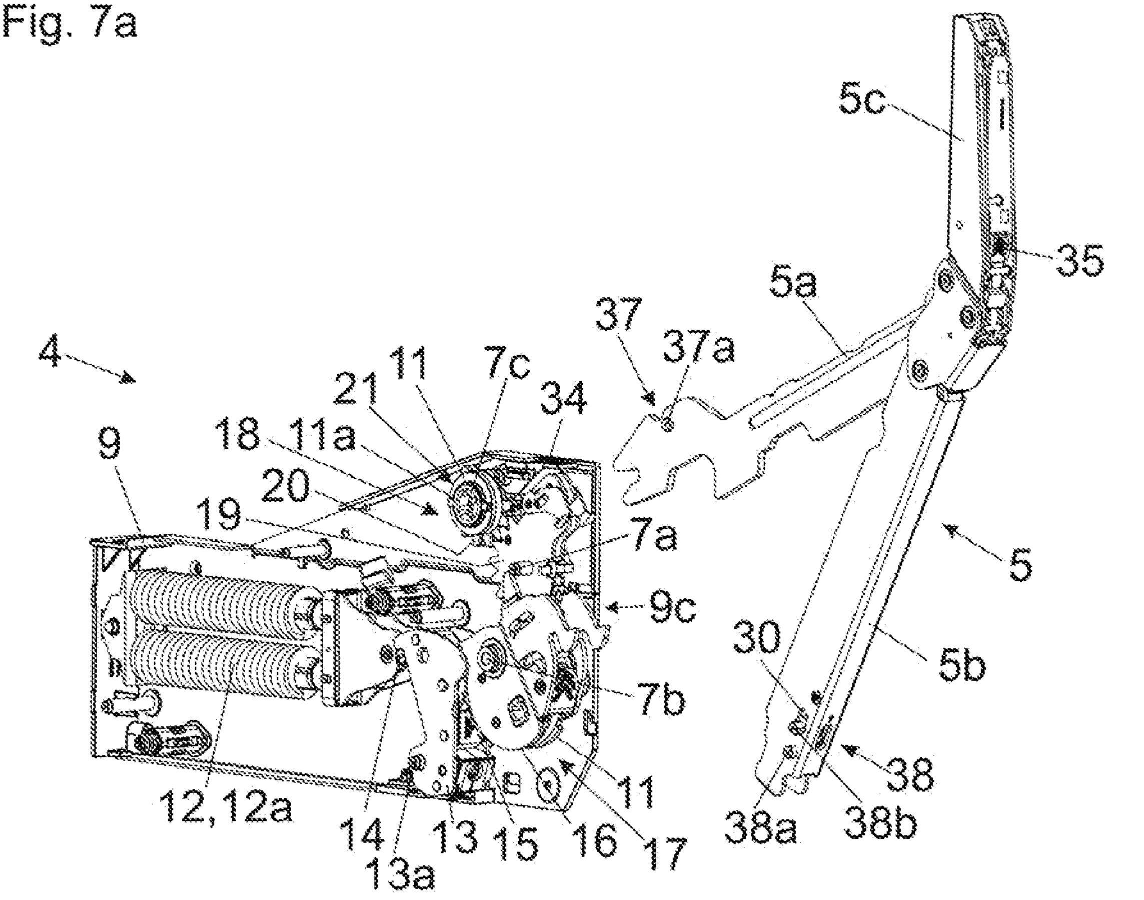
FIGS. 7*a*, 7*b* show a further embodiment of a furniture drive with a base body and an actuating arm configured to be fixed to the base body in a perspective view and in a side view.
Figure 7B:
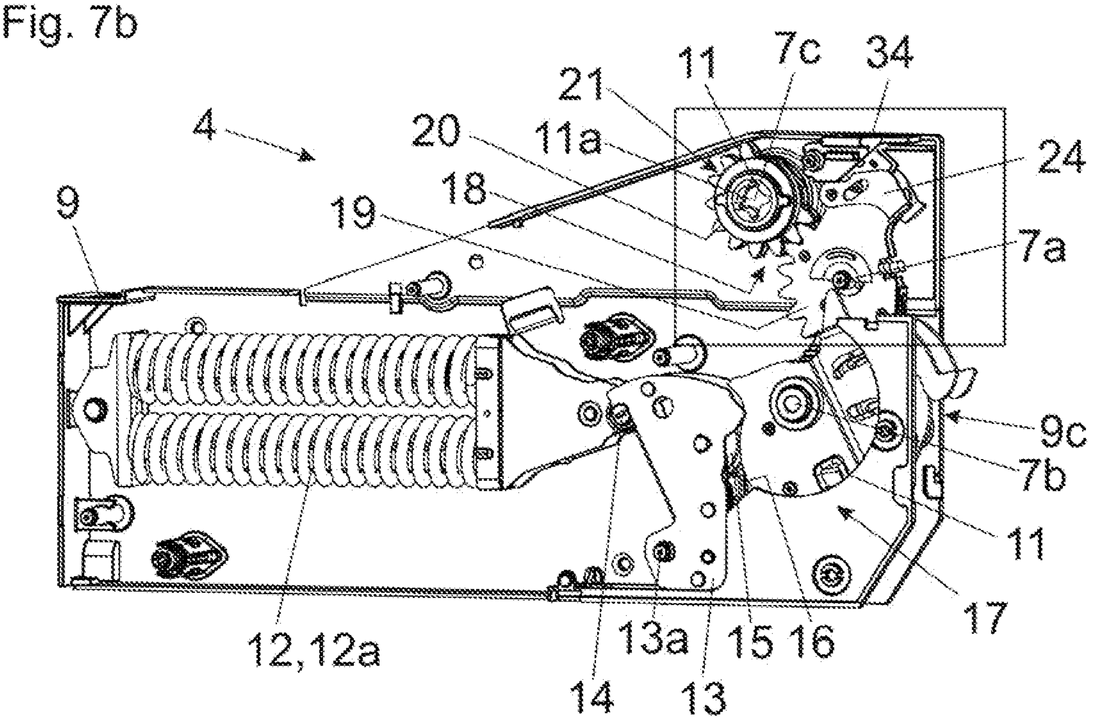

FIG. 7*a* and FIG. 7*b* show a perspective view and a side view of further embodiment of a furniture drive 4 including a base body 9 and an actuating arm 5 configured to be connected to the base body 9. Generally, the construction of the furniture drive 4 corresponds to the previous embodiment.

The furniture drive 4 shown in FIG. 7*a*, 7*b* includes an interface 21 for fixing the synchronization shaft 6 (FIG. 1*b*). By the synchronization shaft 6, a pivoting movement of the actuating arm 5 can be synchronized with a pivoting movement of an actuating arm 5 of at least one further furniture drive 4.

The interface 21 includes at least one component 11 pivotable about the pivoting axis 7*c*, and the pivoting axis 7*c* is arranged laterally offset to the first pivoting axis 7*a* of the actuating arm 5.

In this way, several constructive advantages can be provided. For example, the pivotable component 11, in mounted condition of the furniture drive 4 on the furniture carcass 2, can be arranged on a possibly high position within the furniture carcass 2. Therefore, the synchronization shaft 6 coupled to the pivotable component 11 does hardly impede the storage and the removal of storage items into and from the furniture carcass 2.

This can be constructively realized in that the base body 9 has at least one front opening 9*c* through which the at least one actuating arm 5 at least partially protrudes in at least one relative position corresponding to an open position of the movable furniture front 3, and the first pivoting axis 7*a* has a smaller perpendicular distance to the at least one front opening 9*c* than the pivoting axis 7*c* of the component 11 to be coupled to the synchronization shaft 6.

Moreover, the pivotable component 11, in a mounted condition of the furniture drive 4 on the furniture carcass 2, can be arranged on a position as deep as possible in a direction extending in the depth of the furniture carcass 2, and the synchronization shaft 6 coupled to the pivotable component 11—also due to a shadowing caused by the furniture carcass 2—barely appears from a visual point of view.

This can be constructively realized in that the base body 9 has at least one upper side 34 facing towards a top panel 2*a* (FIG. 1*a*, 1*b*) of the furniture carcass 2 in a mounted condition of the furniture drive 4 on the furniture carcass 2, and the first pivoting axis 7*a* of the lever 5*a* has a larger perpendicular distance to the at least one upper side 34 than the pivoting axis 7*c* of the pivotable component 11.

The component 11 pivotable about the pivoting axis 7*c* includes a receiving device 11*a* configured to receive the synchronization shaft 6. Preferably, the receiving device 11*a* includes a non-circular cross-section for receiving the synchronization shaft 6. It can be particularly preferred that the synchronization shaft 6 can be connected to the receiving device 11*a* only in one single pivoting position within a pivoting angle range of 360°.

The furniture drive 4 includes at least one coupling device 18 configured to couple a pivoting movement of the at least one actuating arm 5 to a pivoting movement of the at least one component 11 of the interface 21.

According to an embodiment, the at least one coupling device 18 includes an eccentric transmission.

Figure 8A:
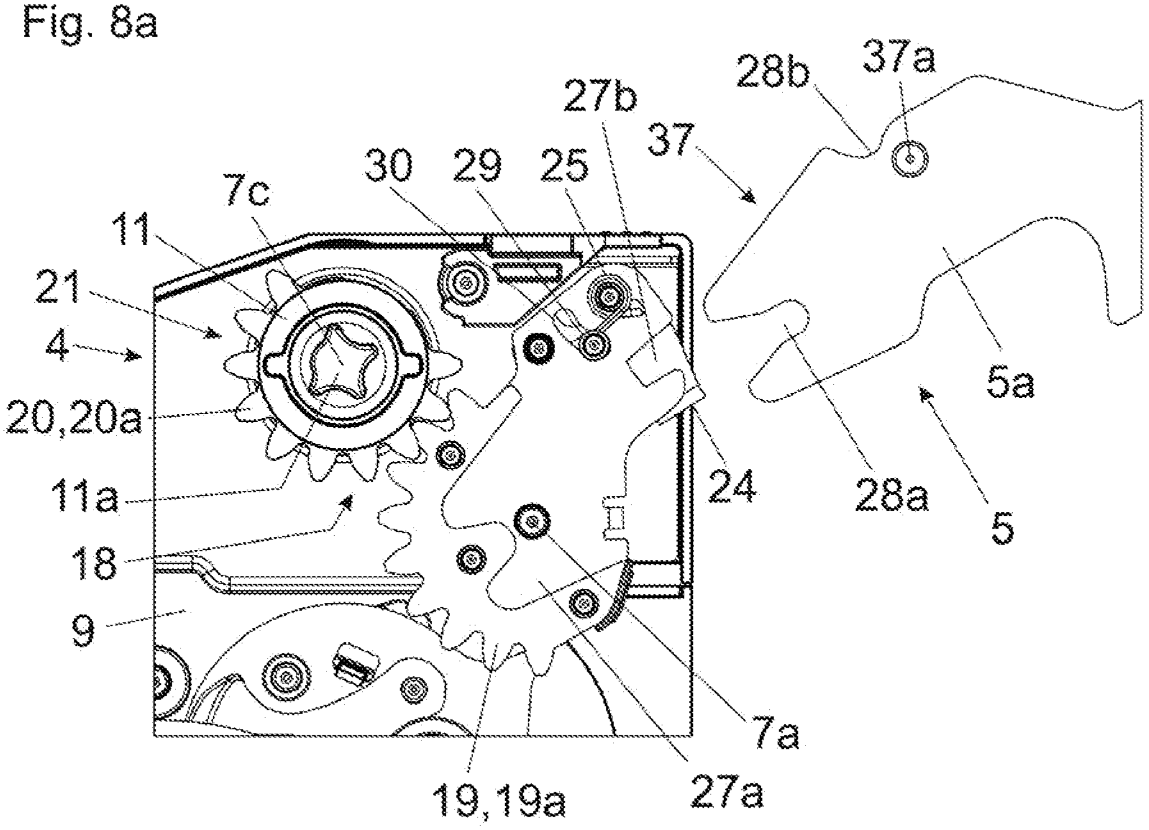
FIGS. 8*a*, 8*b* are side views of the furniture drive according to FIGS. 7*a*, 7*b* with a first lever of the actuating arm in an unconnected and in a connected condition with the base body.
Figure 8B:
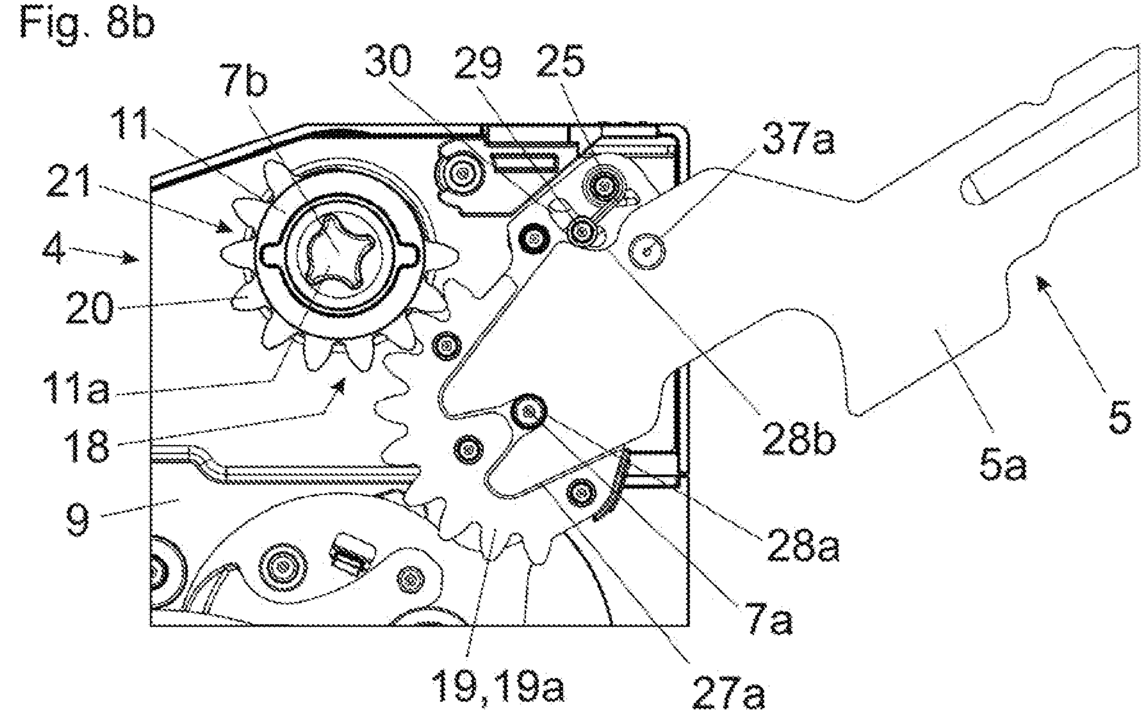

The coupling device 18 can include at least one tooth arrangement 19, 20. Preferably, the at least one tooth arrangement 19, 20 includes at least one tooth segment 19*a*, 20*a* (FIG. 8*a*, 8*b*).

According to an embodiment, the coupling device 18 includes at least one tooth arrangement 19, 20, and one tooth arrangement 19 is connected or is configured to be connected to the actuating arm 5, and the other tooth arrangement 20 is connected or is configured to be connected to the interface 21.

The actuating arm 5 includes a plurality of levers 5*a*, 5*b*, 5*c* hingedly connected to one another, the levers 5*a*, 5*b*, 5*c* being symmetrically arranged relative to a notional middle plane (ME) of the actuating arm 5, and at least two of the levers 5*a*, 5*b* are configured to be releasably connected to the base body 9.

The first lever 5*a* includes a first connection device 37 having a fastening portion 37*a*, whereas the second lever 5*b* includes a second connection device 38 having a fastening portion 38*a* and a locking element 38*b*. The locking element 38*b* is movable along a guide track 30 against a force of a spring 25 (not shown here).

FIG. 8*a* shows the first lever 5*a* of the actuating arm 5, the first lever 5*a* being configured to be connected to the base body 9. The tooth arrangement 19, preferably a tooth segment 19*a*, includes at least one, preferably funnel-shaped, recess 27*a* for partially receiving the lever 5*a*. It can be seen that a contour of the recess 27*a* is at least partially adapted to a contour of the lever 5*a*. The lever 5*a*, in a connected condition, engages into the recess 27*a* in a form-locking manner.

The lever 5*a* is to be hung into a first locking element arranged on the first pivoting axis 7*a* via a first notch 28*a*. Upon inserting the lever 5*a* into the recess 27*a*, a second locking element 29 is moved along a guide track 30 against a force of the spring 25 due to the co-operation with the lever 5*a*.

A fastening portion 37*a*, for example a peg protruding laterally from the lever 5*a*, is arranged on the lever 5*a*. The fastening portion 37*a*, in a connected condition of the lever 5*a*, engages into a further recess 27*b*. The locking of the lever 5*a* can be established by the locking element 29, and the locking element 29 is configured to lock into the second notch 28*b* of the lever 5*a* by a force of the spring 25 (FIG. 8*b*).

By the three-point locking (that is to say due to the notch 28*a* on the pivoting axis 7*a*, the fastening portion 37*a* in the recess 27*b*, and the locking element 29 in the notch 28*b*), a particularly tilting-proof connection of the lever 5*a* relative to the base body 9 can be established.

The recess 27*a* of the tooth arrangement 19 can form an insertion funnel for introducing the lever 5*a* of the actuating arm 5. Therefore, the lever 5*a*, upon mounting, can be centered in a direction of the pivoting axis 7*a*.

For releasing the locking between the lever 5*a* and the base body 9, the unlocking element 24 is moved (for example with the aid of a tool) against a force of the spring 25, until the second locking element 29 can be unlocked from the second notch 28*b* of the lever 5*a*.

FIG. 8*b* shows the connected condition of the lever 5*a* with the base body 9 of the furniture drive 4.

Figure 9A:
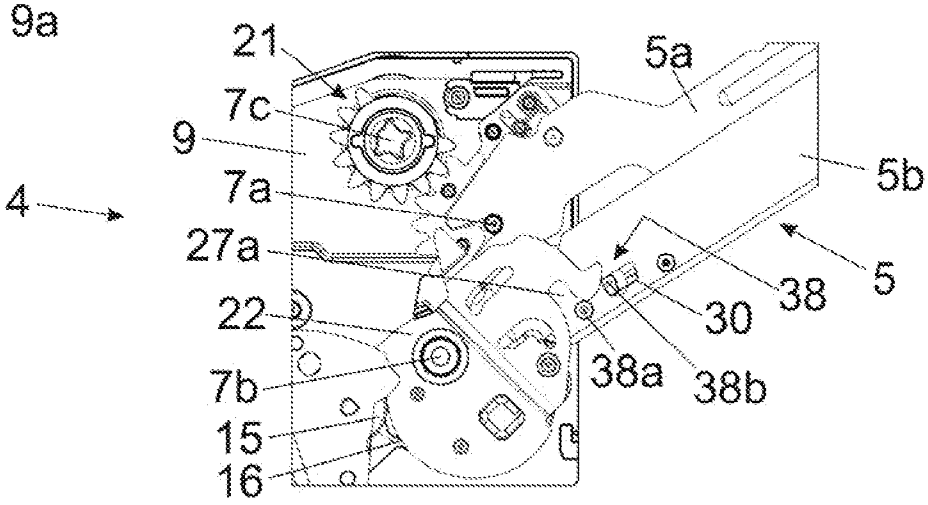
FIGS. 9*a*-9*c* show the mounting operation of the second lever of the actuating arm to the base body of the furniture drive.
Figure 9B:
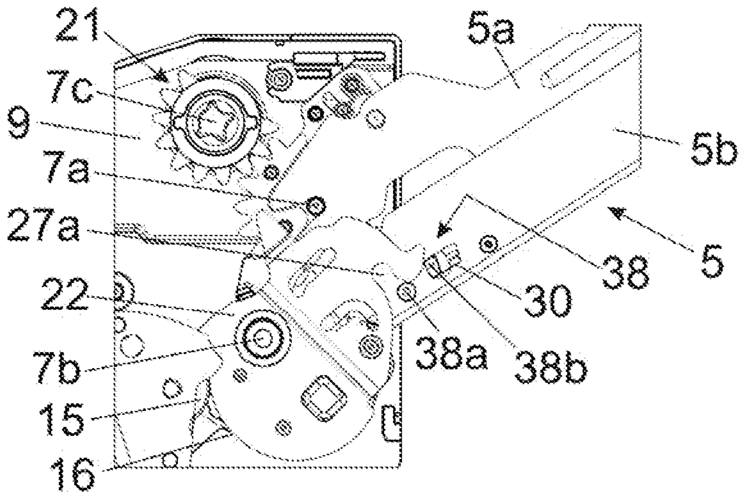
Figure 9C:
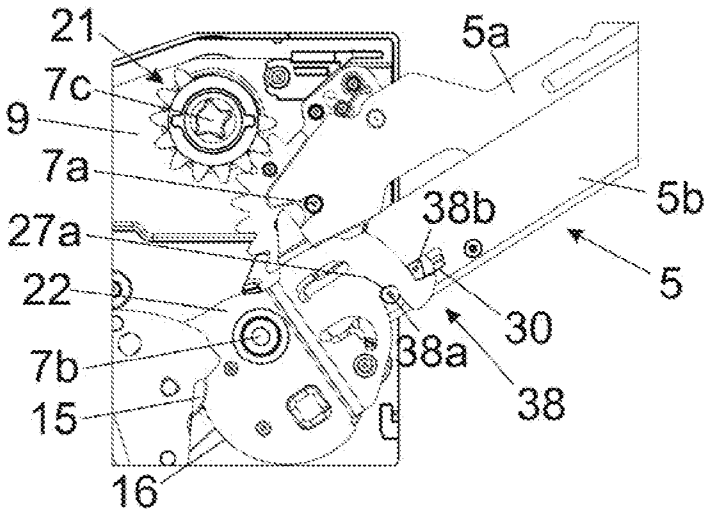

FIG. 9*a*-9*c* show the mounting operation of the second lever 5*b* of the actuating arm 5 to the base body 9 of the furniture drive 4. The first lever 5*a* is already hingedly connected to the base body 9.

The second lever 5*b* is pivoted in a direction towards the base body 9, and the fastening portion 38*a* of the lever 5*b* is to be introduced into the recess 27*a* of the actuating portion 22, the actuating portion 22 being pivotable about the second pivoting axis 7*b*. The spring-loaded locking element 38*b* of the lever 5*b* bears against a guide contour of the actuating portion 22 (FIG. 9*a*).

By manually pushing the fastening portion 38*a* into the recess 27*a* of the actuating portion 22, the locking element 38*b* is moved along the guide track 30 against the force of a spring 25. As a result, the spring 25 can be loaded (FIG. 9*b*).

When the fastening portion 38*a* is further pushed into the recess 27*a*, the locking element 38*b* snaps into a locking recess of the actuating portion 22 by the force of the discharging spring 25. As a result, the second lever 5*b* can be releasably locked to the actuating portion 22. The locked position of the lever 5*b* is thus shown in FIG. 9*c*.

For releasing the locking, the locking element 38*b* is moved, for example with the aid of a tool, against the force of its pressurizing spring 25, and the lever 5*b* of the actuating arm 5 can be released.

Figure 10A:
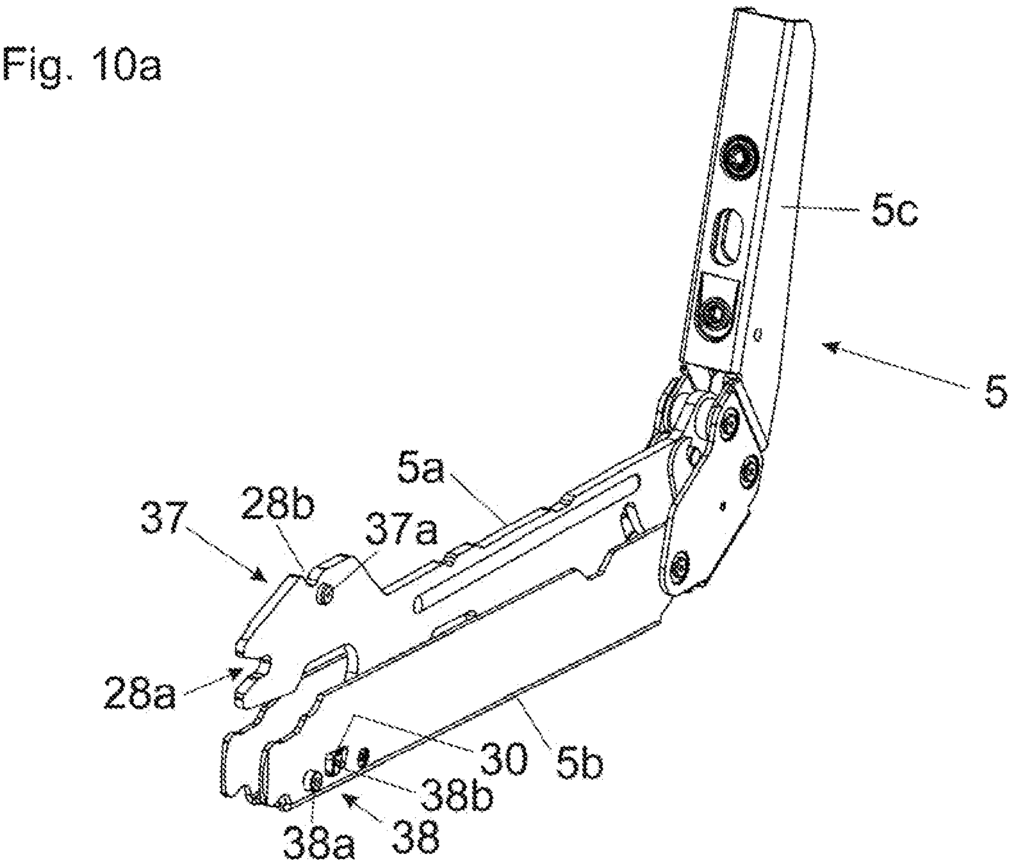
FIGS. 10*a*-10*c* show the actuating arm in different views.
Figure 10B:
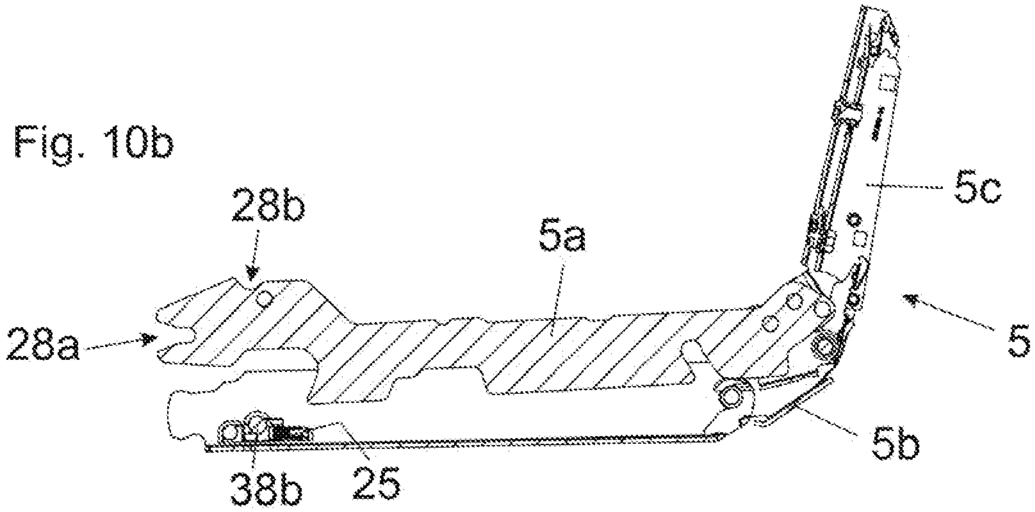
Figure 10C:
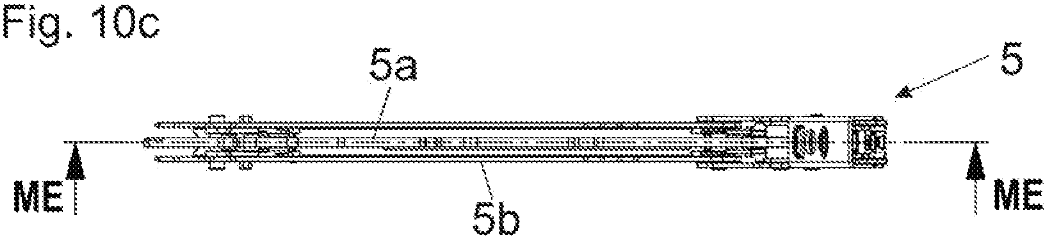

FIG. 10*a*-10*c* show the actuating arm 5 with the hingedly connected levers 5*a*, 5*b*, 5*c* in different views.

FIG. 10*a* shows a perspective view of the actuating arm 5, in which the two connection devices 37, 38 for connecting the actuating arm 5 to the base body 9 of the furniture drive 4 can be seen.

FIG. 10*b* shows a cross-sectional view of the actuating arm 5 shown in FIG. 10*a*, in which the locking element 38*b* pressurized by a spring 25 can be seen.

FIG. 10*c* shows the actuating arm 5 in a cross-sectional view, in which the symmetrical construction of the levers 5*a*, 5*b*, 5*c* relative to a notional middle plane (ME) can be clearly seen.

The method according to the invention for mounting an actuating arm 5 to a base body 9 of a furniture drive 4 is characterized by the following steps:

- in a first step, a first lever 5*a* of the actuating arm 5 is releasably connected to the base body 9,
- in a second step, a second lever 5*b* of the actuating arm 5 is pivoted relative to the first lever 5*a*, and
- in a third step, a second lever 5*b* of the actuating arm 5 is releasably connected to the base body 9 of the furniture drive 4.

The invention claimed is:

1. A furniture drive for moving a furniture front relative to a furniture carcass, the furniture drive comprising:

- a base body to be fixed to the furniture carcass; and
- an actuating arm pivotally attached to the base body about a first pivoting axis in a mounted condition, the actuating arm including a plurality of levers hingedly connected to one another,
- wherein at least two of the levers of the actuating arm are configured to be releasably connected to the base body of the furniture drive, and the plurality of levers of the actuating arm are symmetrically arranged with respect to a notional middle plane of the actuating arm, the notional middle plane extending along a length of the actuating arm and being perpendicular to a width direction of the actuating arm, and
- wherein:
  - at least two of the levers of the actuating arm, in at least one pivoting position of the actuating arm are nested into each other, so that the at least two of the levers are arranged in a gap-free manner relative to one another in a side view; or
  - at least one of the levers is U-shaped in a cross-section, and another of the levers is configured to be at least partially arranged between vertical limbs of the U-shape.

2. The furniture drive according to claim 1, wherein one of the levers of the actuating arm is arranged in the notional middle plane of the actuating arm.

3. The furniture drive according to claim 1, wherein the actuating arm is movable between a closed position and a maximum open position, wherein the actuating arm, in the closed position, is at least partially arranged within the base body of the furniture drive.

4. The furniture drive according to claim 1, wherein the plurality of levers of the actuating arm form a four-pivot-point geometry, wherein one of the four pivot points of the four-pivot-point geometry corresponds to the at least one pivoting axis of the actuating arm.

5. The furniture drive according to claim 1, wherein the actuating arm is pivotally supported about a second pivoting axis on the base body,

- wherein the base body of the furniture drive has a front opening, and the actuating arm projects at least partially through the front opening in a maximum open position, wherein the second pivoting axis has a smaller perpendicular distance to the front opening than the first pivoting axis, or
- wherein the base body of the furniture drive has an upper side configured to face towards a top panel of the furniture carcass in a fixed condition of the furniture drive on the furniture carcass, and wherein the second pivoting axis has a smaller perpendicular distance to the upper side than the second pivoting axis.

6. The furniture drive according to claim 5, wherein the second pivoting axis corresponds to a pivot point of a four-pivot-point geometry of the plurality of levers of the actuating arm.

7. The furniture drive according to claim 1, wherein the plurality of levers of the actuating arm:

- includes at least three levers hingedly connected to one another; or
- includes at least one angled lever.

8. The furniture drive according to claim 7, wherein the plurality of levers of the actuating arm includes the at least one angled lever, and wherein two partial portions of the at least one angled lever adopt an angle of substantially 90° relative to one another.

9. The furniture drive according to claim 1, wherein the at least two of the levers of the actuating arm includes a first lever and a second lever by which the actuating arm is pivotally connected to the base body, and plurality of levers of the actuating arm further includes a third lever on which a fastening interface is arranged, wherein the actuating arm is configured to be fixed to the furniture front via the fastening interface, and wherein the first lever and the second lever are hingedly connected to the third lever.

10. The furniture drive according to claim 9, wherein the actuating arm is configured to be releasably fixed to the furniture front via the fastening interface.

11. The furniture drive according to claim 1, wherein the furniture drive includes a force storage member for applying a force to the actuating arm so as to compensate for a weight of the furniture front to be fixed to the actuating arm.

12. The furniture drive according to claim 11, wherein the force storage member is arranged on the base body and has at least one spring element.

13. The furniture drive according to claim 1, further comprising an interface configured to be fixed to a synchronization shaft by which a pivoting movement of the actuating arm can be synchronized with a pivoting movement of at least one actuating arm of at least one further furniture drive.

14. The furniture drive according to claim 13, wherein the interface includes a pivotable component which is pivotable about a pivoting axis, and wherein the pivoting axis of the pivotable component is arranged laterally offset from the first pivoting axis of the actuating arm.

15. The furniture drive according to claim 14, further comprising a coupling device configured to couple a pivoting movement of the actuating arm to a pivoting movement of the pivotable component of the interface.

16. The furniture drive according to claim 15, wherein
the coupling device includes an eccentric transmission, or
the coupling device includes at least one tooth arrangement, or
the coupling device includes at least one tooth arrangement having a tooth segment, wherein the tooth segment includes a connection device configured to be connected to one of the plurality of levers of the actuating arm.

17. The furniture drive according to claim 16, wherein the coupling device includes the at least one tooth arrangement, and the at least one tooth arrangement includes at least one tooth segment, or
the coupling device includes the at least one tooth arrangement having the tooth segment which includes the connection device, and wherein the connection device includes at least one recess for partially receiving a lever of the plurality of levers of the actuating arm.

18. The furniture drive according to claim 1, further comprising a connection device configured to releasably connect the actuating arm to the base body of the furniture drive.

19. The furniture drive according to claim 18, wherein the connection device:
includes at least one connection portion configured to be hung into or slid into the base body; or
includes at least one locking element pressurized by a spring; or
includes at least one locking element configured to be guided along a guide track; or
includes at least one recess for partially receiving a lever of the plurality of levers of the actuating arm.

20. The furniture drive according to claim 1, further comprising a movable actuating portion.

21. The furniture drive according to claim 20, wherein the movable actuating portion is pivotable about a pivoting axis, and one of the plurality of levers of the actuating arm is configured to be releasably connected to the movable actuating portion.

22. An item of furniture comprising:
a furniture carcass;
a furniture front; and
the furniture drive according to claim 1, wherein the base body of the furniture drive is fixed to the furniture carcass, and the furniture front is fixed to the actuating arm of the furniture drive.

23. The item of furniture according to claim 22, wherein the base body is fixed to or within a sidewall of the furniture carcass, and the furniture front is fixed to the actuating arm of the furniture drive via a fastening interface.

24. A method for mounting an actuating arm to a base body of the furniture drive according to claim 1, comprising:
releasably connecting a first lever of the actuating arm to the base body;
pivoting a second lever of the actuating arm relative to the first lever; and
releasably connecting the second lever of the actuating arm to the base body of the furniture drive.

25. The furniture drive according to claim 1, wherein the at least two of the levers of the actuating arm are nested into each other so that the at least two levers are arranged in the gap-free manner relative to one another in a side view, and are so nested in each of a plurality of pivoting positions of the actuating arm.

26. A furniture drive for moving a furniture front relative to a furniture carcass, the furniture drive comprising:
a base body to be fixed to the furniture carcass; and
an actuating arm pivotally supported on the base body about a first pivoting axis in a mounted condition, the actuating arm including a plurality of levers hingedly connected to one another,
wherein at least two of the levers of the actuating arm are configured to be releasably connected to the base body of the furniture drive, and the plurality of levers of the actuating arm are symmetrically arranged with respect to a notional middle plane of the actuating arm,
wherein the furniture drive includes a force storage member for applying a force to the actuating arm so as to compensate for a weight of the furniture front to be fixed to the actuating arm,
wherein the furniture drive further comprises a transmission mechanism for transmitting a force, that can be stored in the force storage member, to the actuating arm, and
wherein the transmission mechanism:
includes an intermediate lever; or
includes a pressure portion and a setting contour on which the pressure portion can be displaceably supported upon a movement of the actuating arm.

27. The furniture drive according to claim 26, wherein the transmission mechanism:
includes the intermediate lever, and the force storage member is connected to the intermediate lever via an engagement location, or
includes the pressure portion and the setting contour, wherein the pressure portion comprises a rotatable pressure roller.

28. The furniture drive according to claim 26, wherein the transmission mechanism includes the intermediate lever, and includes the pressure portion and the setting contour,
and wherein the pressure portion is arranged on the intermediate lever and the setting contour is arranged on the actuating arm, or the pressure portion is arranged on the actuating arm and the setting contour is arranged on the intermediate lever.

29. A furniture drive for moving a furniture front relative to a furniture carcass, the furniture drive comprising:
a base body to be fixed to the furniture carcass; and
an actuating arm pivotally attached to the base body about a first pivoting axis in a mounted condition, the actuating arm including a plurality of levers hingedly connected to one another,
wherein at least two of the levers of the actuating arm are configured to be releasably connected to the base body of the furniture drive, and the plurality of levers of the actuating arm are symmetrically arranged with respect to a notional middle plane of the actuating arm, the notional middle plane extending along a length of the actuating arm and being perpendicular to a width direction of the actuating arm, wherein the plurality of levers of the actuating arm includes at least one angled lever, and wherein two partial portions of the at least one angled lever adopt an angle of substantially 90° relative to one another.

30. A furniture drive for moving a furniture front relative to a furniture carcass, the furniture drive comprising:

a base body to be fixed to the furniture carcass; and an actuating arm pivotally attached to the base body about a first pivoting axis in a mounted condition, the actuating arm including a plurality of levers hingedly connected to one another, wherein at least two of the levers of the actuating arm are configured to be releasably connected to the base body of the furniture drive, and the plurality of levers of the actuating arm are symmetrically arranged with respect to a notional middle plane of the actuating arm, the notional middle plane extending along a length of the actuating arm and being perpendicular to a width direction of the actuating arm, wherein the furniture drive further comprises an interface configured to be fixed to a synchronization shaft by which a pivoting movement of the actuating arm can be synchronized with a pivoting movement of at least one actuating arm of at least one further furniture drive, wherein the interface includes a pivotable component which is pivotable about a pivoting axis, and wherein the pivoting axis of the pivotable component is arranged laterally offset from the first pivoting axis of the actuating arm, wherein the furniture drive further comprises a coupling device configured to couple a pivoting movement of the actuating arm to a pivoting movement of the pivotable component of the interface, and wherein:

the coupling device includes an eccentric transmission; or the coupling device includes at least one tooth arrangement; or the coupling device includes at least one tooth arrangement having a tooth segment, wherein the tooth segment includes a connection device configured to be connected to one of the plurality of levers of the actuating arm.

31. The furniture drive according to claim 30, wherein the coupling device includes the at least one tooth arrangement, and the at least one tooth arrangement includes at least one tooth segment, or the coupling device includes the at least one tooth arrangement having the tooth segment which includes the connection device, and wherein the connection device includes at least one recess for partially receiving a lever of the plurality of levers of the actuating arm.

32. A furniture drive for moving a furniture front relative to a furniture carcass, the furniture drive comprising:

a base body to be fixed to the furniture carcass; and an actuating arm pivotally attached to the base body about a first pivoting axis in a mounted condition, the actuating arm including a plurality of levers hingedly connected to one another, wherein at least two of the levers of the actuating arm are configured to be releasably connected to the base body of the furniture drive, and the plurality of levers of the actuating arm are symmetrically arranged with respect to a notional middle plane of the actuating arm, the notional middle plane extending along a length of the actuating arm and being perpendicular to a width direction of the actuating arm, wherein the furniture drive further comprises a connection device configured to releasably connect the actuating arm to the base body of the furniture drive, and wherein the connection device:

includes at least one connection portion configured to be hung into or slid into the base body; or includes at least one locking element pressurized by a spring; or includes at least one locking element configured to be guided along a guide track; or includes at least one recess for partially receiving a lever of the plurality of levers of the actuating arm.

* * * * *